(12) United States Patent
Lee

(10) Patent No.: US 7,158,818 B2
(45) Date of Patent: Jan. 2, 2007

(54) SLIDE TYPE MOBILE TERMINAL AND SLIDING MECHANISM THEREOF

(75) Inventor: Jin-Ho Lee, Incheon (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/977,184

(22) Filed: Oct. 28, 2004

(65) Prior Publication Data

US 2005/0122669 A1  Jun. 9, 2005

(30) Foreign Application Priority Data

| Oct. 28, 2003 | (KR) | ...................... 10-2003-0075592 |
| Oct. 30, 2003 | (KR) | ...................... 10-2003-0076480 |
| Nov. 13, 2003 | (KR) | ...................... 10-2003-0080290 |
| Dec. 6, 2003 | (KR) | ...................... 10-2003-0088399 |

(51) Int. Cl.
*H04M 1/00* (2006.01)

(52) U.S. Cl. .............. 455/575.4; 455/575.1; 455/550.1

(58) Field of Classification Search ............ 455/550.1, 455/575.1, 575.4; 361/679, 600; 439/630
See application file for complete search history.

(56) References Cited

U.S. PATENT DOCUMENTS 5,956,625 A * 9/1999 Hansen et al. ........... 455/575.4

2005/0079902 A1* 4/2005 Chen et al. .............. 455/575.4

FOREIGN PATENT DOCUMENTS

| JP | 11-317583 | 11/1999 |
| JP | 2003-125052 | 4/2003 |
| KR | 1020010066450 A | 7/2001 |
| KR | 1020020014431 | 2/2002 |
| KR | 1020020074870 | 10/2002 |
| KR | 1020020088214 | 11/2002 |
| KR | 20-0326418 | 9/2003 |
| KR | 10-2005-0045708 | 5/2005 |

* cited by examiner

*Primary Examiner*—Duc Nguyen
*Assistant Examiner*—Justin Lee
(74) *Attorney, Agent, or Firm*—Lee, Hong, Degerman, Kang & Schmadeka

(57) ABSTRACT

In accordance with one aspect of the invention, a slide type mobile terminal comprises a first body; a second body slidably installed on the first body; and a sliding mechanism installed between the first body and the second body for guiding a slide motion of the second body in relation to the first body such that the second body automatically slides over a substantial portion of the first body after the second body slides over a first portion of the first body by way of exertion of external force.

8 Claims, 21 Drawing Sheets

SLIDE TYPE MOBILE TERMINAL AND SLIDING MECHANISM THEREOF

CROSS-REFERENCE TO RELATED APPLICATIONS

Pursuant to 35 U.S.C. § 119(a), this application claims the benefit of earlier filing date and right of priority to Korean Application Nos. 2003-75592, 2003-76480, 2003-80290 and 2003-88399, filed on Oct. 28, 2003, Oct. 30, 2003, Nov. 13, 2003, and Dec. 6, 2003, respectively, the contents of which is hereby incorporated by reference herein in its entirety.

BACKGROUND OF THE INVENTION

1. Field of the Invention

The present invention relates to a mobile terminal, and more particularly, to a slide type mobile terminal having a body and a cover connected to each other by a sliding method.

2. Description of the Related Art

Generally, a mobile terminal has a bar type, a flip type, on a folder type structure. Some mobile terminal support an image photographing function or wireless internet that require a liquid crystal screen for displaying various information. In case of the bar type or the flip type terminals, the entire size of the mobile terminal has to be increased in order to mount a comparatively large liquid crystal screen. In case of the folder type, only a liquid crystal screen having a size less than the half of the entire size of the mobile terminal is mounted.

As shown in FIGS. 1 and 2, the related art slide type mobile terminal comprises a body 20 including a circuit portion (not shown) for communication control, a plurality of keys 21 for inputting information, a transmitter 22 for inputting a user's voice signal, an antenna 23 for transmitting and receiving electric wave for communication, a cover 10 slidably mounted at the body 20 and including a liquid crystal screen 11 for displaying image information, a receiver 12 for transmitting a called party's voice to a user, and a battery 24 removably mounted at one side of the body 20 as a power source.

As shown in FIG. 3, a pair of protrusions 18 project from a facing surface of the cover 10 toward the body 20. Also, a pair of guide grooves 25 are recessed at the inside of the body 20 and extend in a slide direction of the body 20 for slidably receiving the protrusions 18 of the cover 10. When the user pushes or pulls the cover 10 along the body 20, the protrusions 18 are moved along the guide grooves 25 and thereby the cover 10 opens or covers the front surface of the body 20.

The cover 10 has to be pushed until the front surface of the body 20 is completely opened, or the cover 10 has to be pulled until the front surface of the body 20 is completely covered. In this process, the user will have to use both hands. That is, the user holds the body 20 with his/her one hand and pushes/pulls the cover 10 with his/her another hand.

Additionally, since the guide grooves 25 of the body 20 are formed on the surface to face the cover 10, the guide grooves 25 are exposed to outside when the front surface of the body 20 is opened. According to this, foreign materials are easily introduced into the guide grooves 25. An improved system is needed to overcome the above problems.

SUMMARY OF THE INVENTION

In accordance with one aspect of the invention, a slide type mobile terminal comprises a first body; a second body slidably installed on the first body; and a sliding mechanism installed between the first body and the second body for guiding a slide motion of the second body in relation to the first body such that the second body automatically slides over a substantial portion of the first body after the second body slides over a first portion of the first body by way of exertion of external force.

The sliding mechanism comprises an elongated rail installed on the second body to allow for the second body to slide over the first body in a first direction; an elastic guide member fixed to the first body for engaging the rail and guiding the second body in a sliding motion in the first direction; and a biasing slide member installed between the rail and the guide member for engaging the guide member in a slidably tight fit causing the elastic guide member to elastically deform as a first portion of the elastic guide slides against a first portion of the slide member.

The rail is formed as an elongated cavity in the second body and the slide member is position inside the cavity in form of an elongated plate, wherein the first portion of the slide member represents a summit point between first and second ends of the elongated plate respectively positioned at first and second ends of the elongated cavity, wherein the first portion of the slide member narrows a width of the elongated cavity.

The guide member comprises a fixed member fixed to the first body; and an elastic member supported by the fixed member for being inserted in the rail so as to engage the slide member. The elastic member is formed in shape of a biasing member that winds around the fixed member. The elastic member comprises a first tapered point configured to tangentially engage a first surface the slide member.

In one embodiment, the mobile terminal further comprise at least two slide members, wherein a first slide member is installed at a first inner side of the rail in an elongated arrangement, and a second slide member is installed at a second inner side of the rail in an elongated arrangement, and wherein the guide member is installed between the first and second slide members.

The elastic member comprises first and second tapered points configured to tangentially engage the first and second slide members on their first surface. The slide member is curved so that the width of the rail can be varied. The slide member has plurality of curved portions and comprises a first curved portion convexly curved towards outside of the rail; and a pair of second curved portions convexly curved towards inside of the rail at both sides of the first curved portion.

In one embodiment, the guide member is positioned at the first curved portion when the second body completely covers the first body. The slide member is tapered towards the guide member on one surface near the first curved portion. The curved portions have the same curved angles to each other. For example, the slide member may have a diametrically symmetric structure.

At least one of the slide member and the elastic member is covered with a lubrication film where surfaces of the elastic member and the slide member connect. The lubrication film is formed from at least one of metal and Teflon. The guide member comprises a connector fixed to the first body; first and second members slidably connected to the connector, respectively, and inserted into the rail so as to contact the slide member; and a biasing member installed between the first member and the second member for providing an elastic force between the first and second members so as to prevent the first and second members from being pushed toward one another beyond a threshold distance.

In accordance with one embodiment, the connector comprises an elongated cavity for receiving the biasing member. The first and second members each comprise a supporting portion having a seat for supporting both one end of the biasing member; a stud extended from the supporting portion for engaging the biasing member.

A system for slidably connecting a cover to a front surface of a mobile communication terminal in accordance with one embodiment comprises a rail member formed as an elongated cavity in an inner face of the cover; a guide member comprising a first part fixed to the front surface of the mobile communication terminal and a second part removably connected to the first part, wherein the second part comprises a first tapered point; and a slide member in shape of an elongated plate, having a width and a length, configured to fit inside the rail member in the elongated cavity such that the width of the elongated plate corresponds to depth of the elongated cavity, and first and second ends of the elongated plate respectively correspond to the first and second ends of the elongated cavity.

The elongated plate is deformed in a first portion to form a summit in between the first and second ends of the elongated plate, such that when the slide member is positioned inside the rail member the length of the elongated plate traverses length of the elongated cavity to divide the elongated cavity into a first side and a second side longitudinally, wherein the first side comprises top portion of the summit and the second side comprises bottom portion of the summit, wherein when the guide member is inserted into the rail, the second part engages the slide member on the first side, such that the first tapered point slidably contacts the summit as the guide member slides along the length of the rail.

When the first tapered point contacts the summit a maximum resistance is applied against sliding movement of the cover along the front surface of the mobile communication terminal.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

First Embodiment

A slide type mobile terminal according to a first embodiment of the present invention will be explained with reference to FIGS. 4 to 12.

Figure 1:
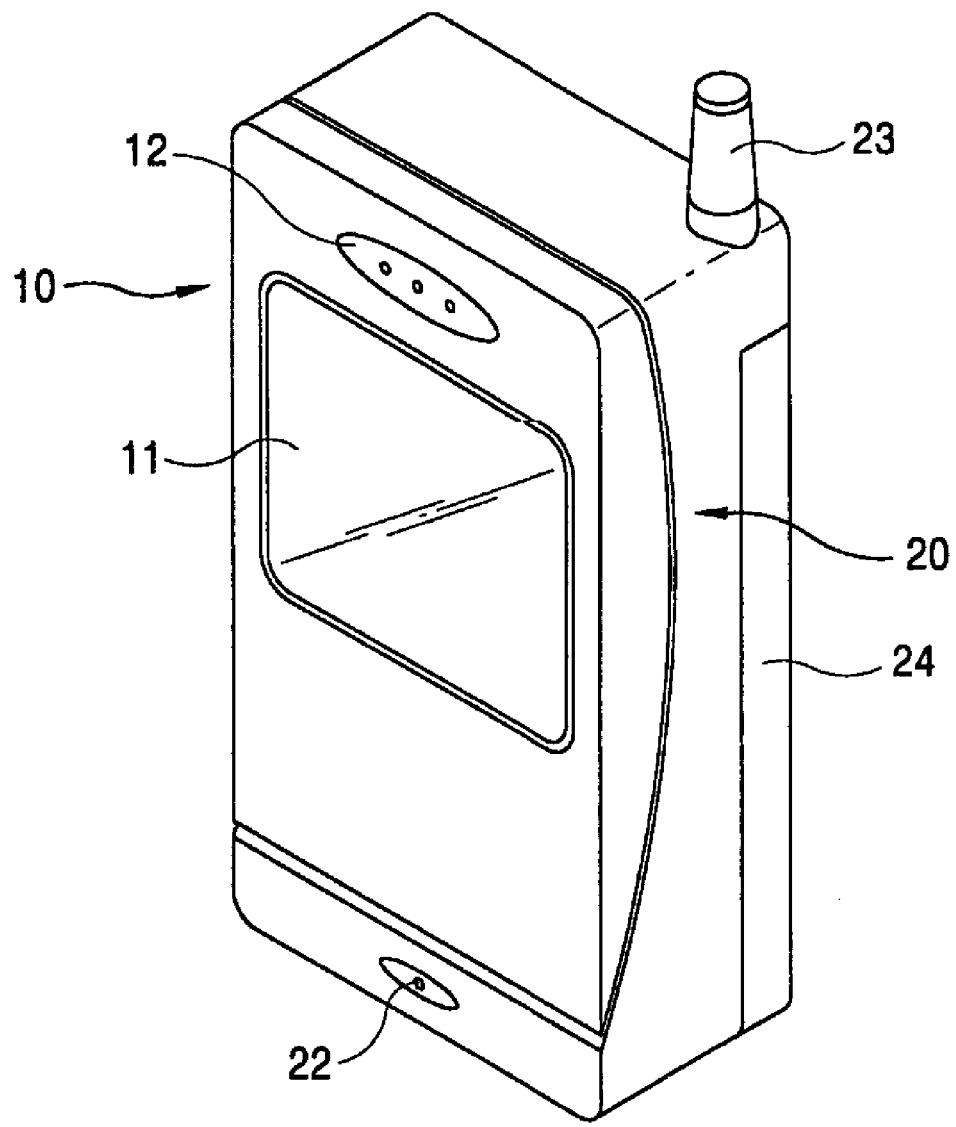
FIG. 1 is a perspective view showing a slide type mobile terminal in accordance with the related art.
Figure 2:
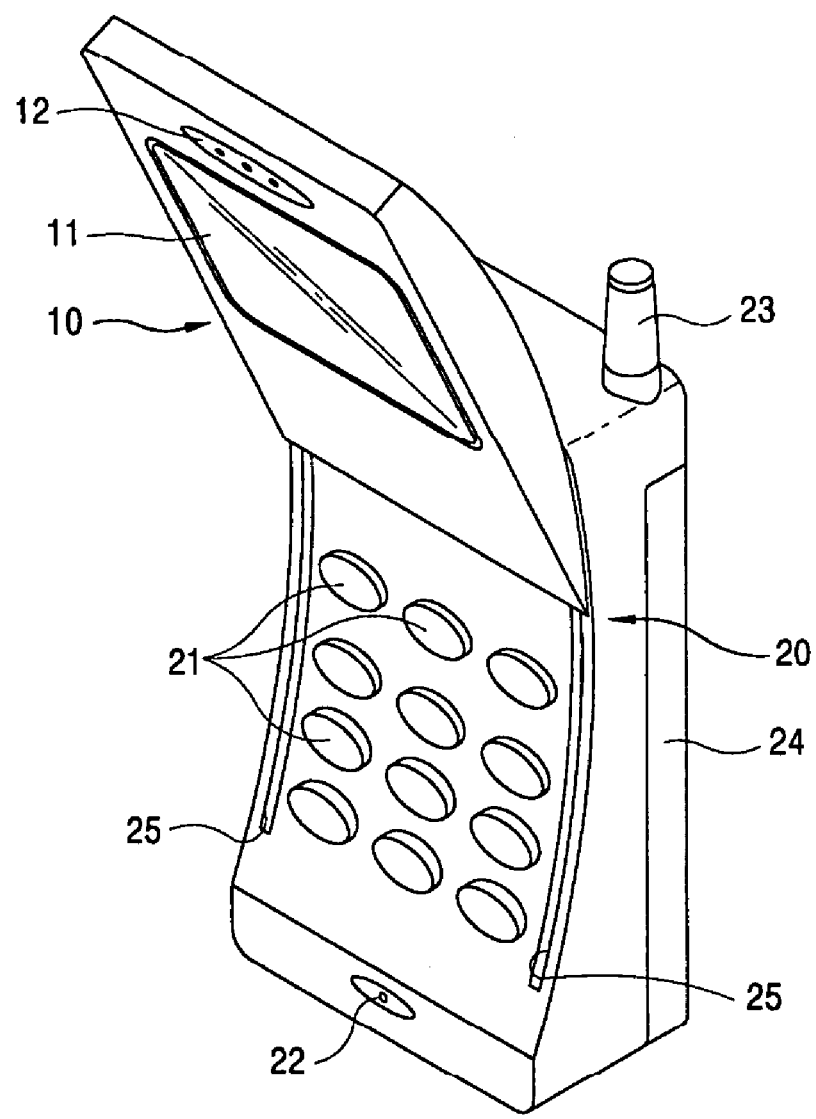
FIG. 2 is a perspective view of a body of the conventional slide type mobile terminal in an opened state.
Figure 3:
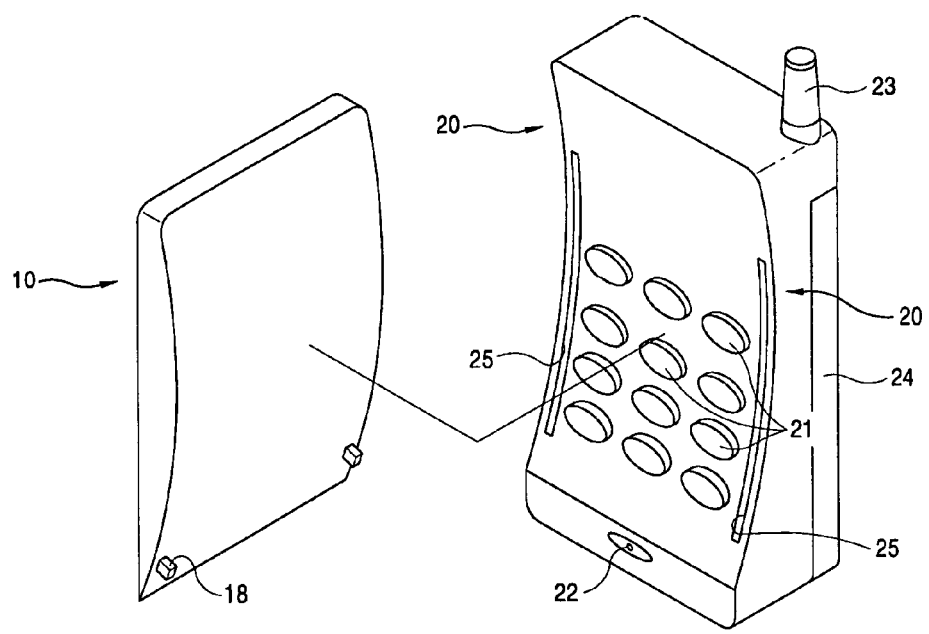
FIG. 3 is a disassembled perspective view showing the related art slide type mobile terminal.
Figure 4:
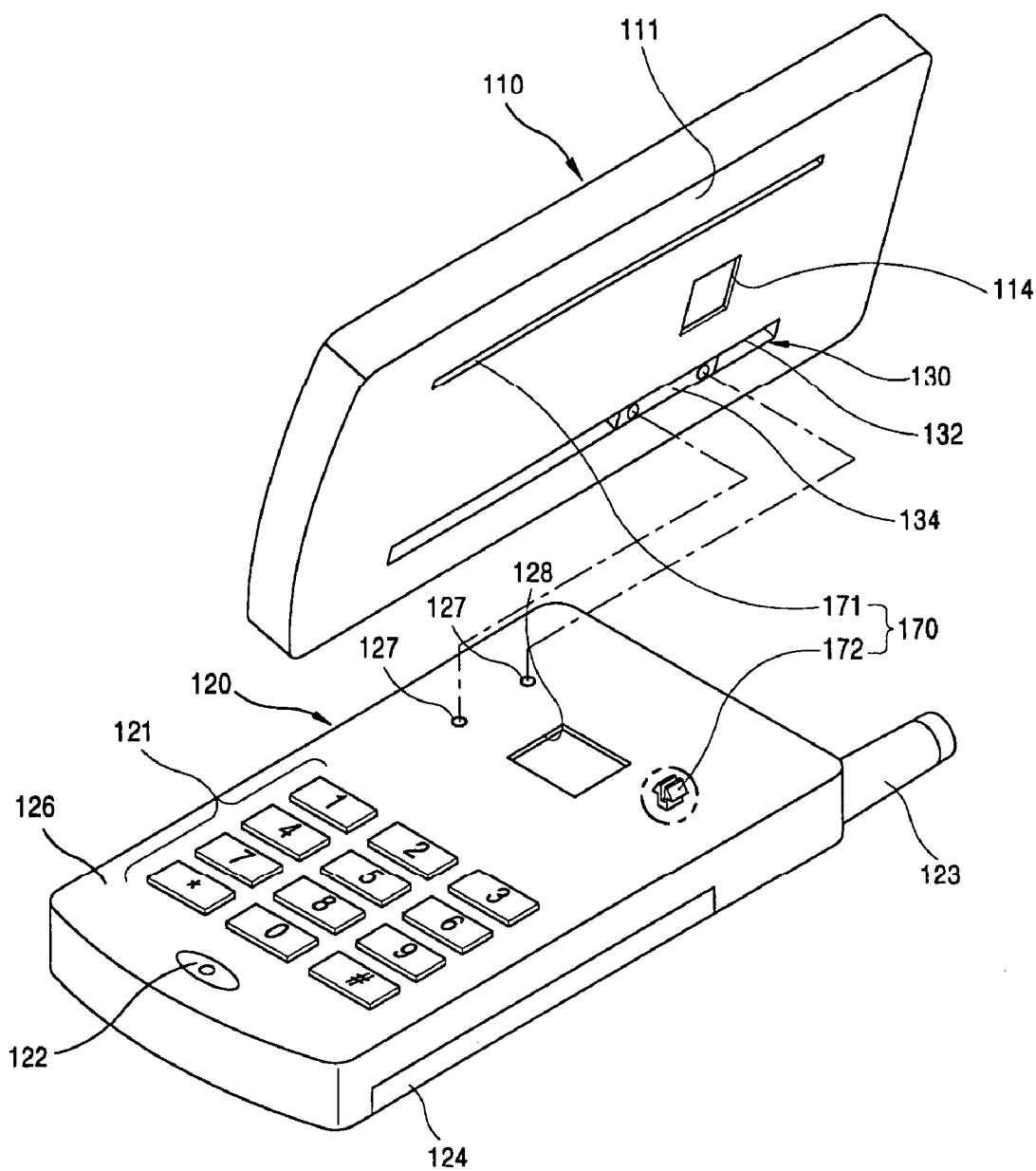
FIG. 4 is a disassembled perspective view showing a slide type mobile terminal according to a first embodiment of the present invention.

As shown in FIG. 4, the slide type mobile terminal according to the first embodiment of the present invention comprises a body 120, a cover 110 slidably mounted on the body 120 for opening and covering a front surface of the body 120, a connector 170 installed between the body 120 and the cover 110 for slidably connecting the cover 110 to the body 120, and a sliding mechanism 130 installed between the body 120 and the cover 110. The sliding mechanism provides for guiding a slide motion of the cover 110 and so that the cover 110 can move automatically when the cover 110 is moved to a certain position by way of application of a relatively slight force.

The cover 110 comprises a cover housing 111, a display portion (not shown) installed at one side of the cover housing 111 for displaying image information, and a receiver (not shown) for transmitting a voice signal to a user. The body 120 and the cover 110 are electrically connected to each other by a flexible printed circuit board (FPCB), for example. Penetration holes 128 and 114 for passing the FPCB are respectively formed at the facing surfaces of the body 120 and the cover 110.

The connector 170 comprises a guide groove 171 formed on the surface of the cover 110 facing the body 120. The guide groove 171 extends in a slide direction of the cover 110. Connector 170 also comprises a connecting member 172 fixed to the body 120 and inserted into the guide groove 171, for connecting the cover 110 to the body 120 in a sliding motion.

Figure 5:
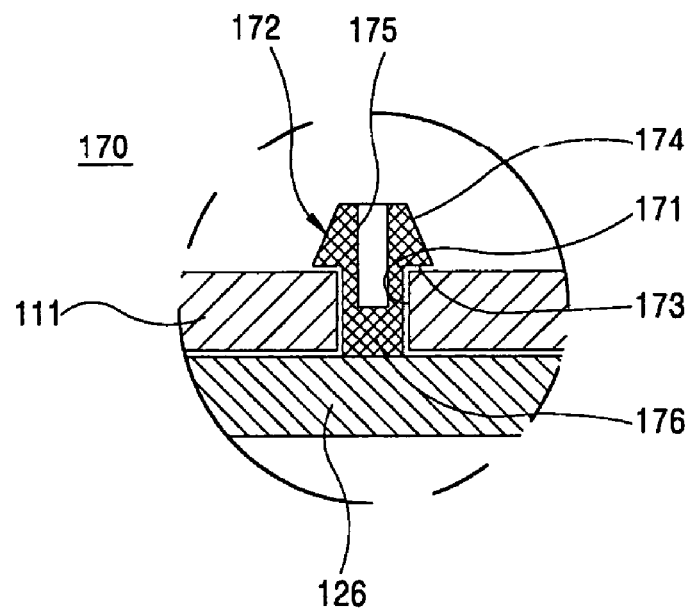
FIG. 5 is an enlarged sectional view of FIG. 4.

As shown in FIG. 5, the guide groove 171 is formed by penetrating into the cover housing 111. The connecting member 172 comprises a supporting portion 176 fixed to the body housing 126 and extended to the guide groove 171, and a head portion 174 formed at one end of the supporting portion 176 and elastically flexible to be inserted into the guide groove 171. A width of the head portion 174 is decreased towards a direction that the head portion 174 is inserted into the guide groove 171. The head portion 174 comprises a step 173 for preventing the head portion 174 from being separated from the guide groove 171, and a slot 175 recessed at the center thereof for allowing an elastic deformation of the head portion 174. In one embodiment, the guide groove 171 is formed on the body housing 126 and the connecting member 172 is form on the cover 110.

Figure 6:
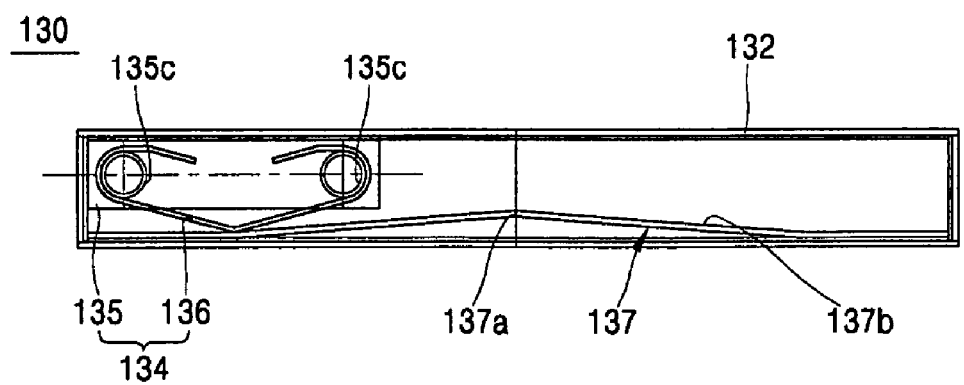
FIG. 6 is a plane view showing a sliding mechanism provided at the slide type mobile terminal according to the first embodiment of the present invention.

As shown in FIG. 6, the sliding mechanism 130 comprises a rail 132 recessed at the inside of the cover housing 111 and extended in a slide direction of the cover 110, a guide member 134 fixed to the body housing 126, slidably inserted into the rail 132, and having an elastic force for guiding a slide motion of the cover 110. A slide member 137 is installed between the rail 132 and the guide member 134 for elastically deforming the guide member 134 so that the guide member 134 can move for itself by its own elastic force along a motion of the rail 132.

Figure 7:
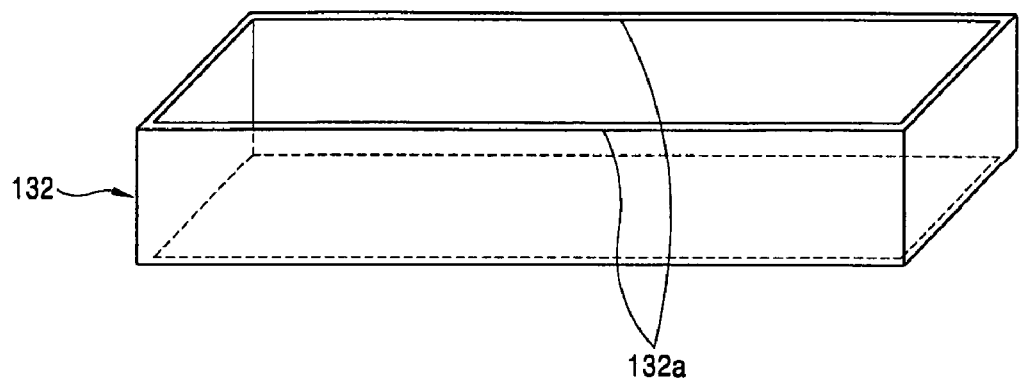
FIG. 7 is a perspective view showing a rail of the sliding mechanism provided at the slide type mobile terminal according to the first embodiment of the present invention.
Figure 8:
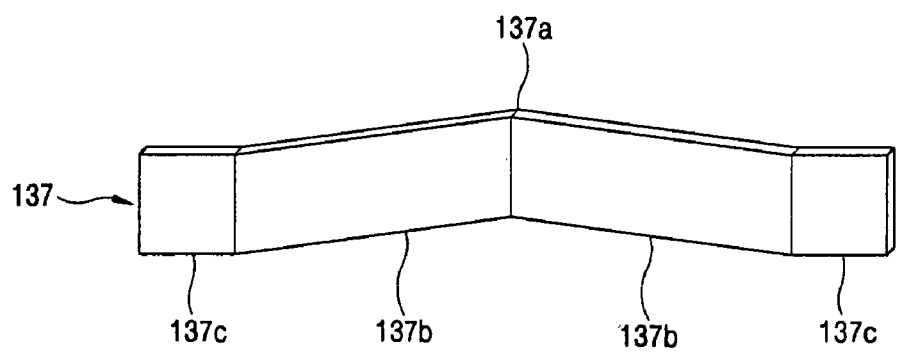
FIG. 8 is a perspective view showing a slide member of the sliding mechanism provided at the slide type mobile terminal according to the first embodiment of the present invention.

As shown in FIG. 7, the rail 132 in one embodiment has a rectangular parallelepiped shape with one side being is opened accordingly as a plurality of plates 132a are coupled one another. Referring to FIG. 8, in one embodiment, the slide member 137 is installed at an inner space of the rail 132 and is formed as a plate having a curved portion 137a convexly curved towards the inner side direction of the rail 132 so as to vary the width of the rail 132 along the slide direction of the cover 110. The slide member 137 is provided with a fixed portion 137c fixed to the inner surface of the rail 132 and an inclined surface 137b being tapered towards the inner side of the rail 132 at both sides thereof.

Figure 9:
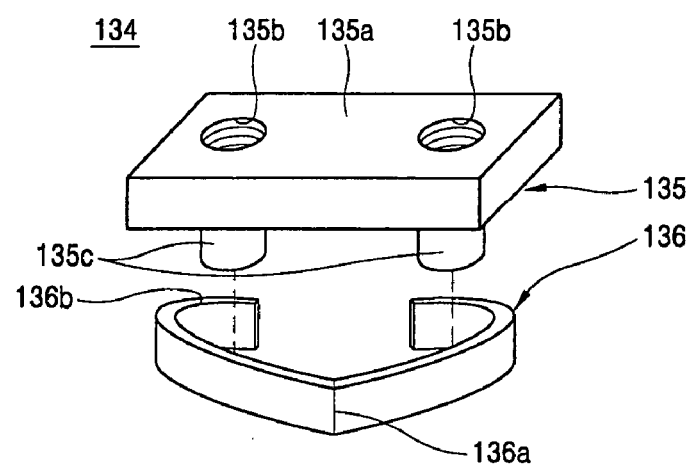
FIG. 9 is a disassembled perspective view showing a guide member of the sliding mechanism provided at the slide type mobile terminal according to the first embodiment of the present invention.

As shown in FIG. 9, the guide member 134 comprises a connecting member 135 fixed to the body housing 126 and an elastic member 136 supported at the connecting member 135 positioned between inner walls of the slide member 137 and the rail 132. Elastic member 136 is elastically deformed according to a width variance of the rail 132 when the rail 132 is moved.

The connecting member 135 comprises a fixing plate 135a having a coupling hole 135b fixed to the body housing 126, and a protrusion 135c protruded from the fixing plate 135a and supporting the elastic member 136. A coupling hole 127 connected to the coupling hole 135b of the fixing plate 135a is formed at the body housing 126. Accordingly a coupling means is inserted into the coupling hole 127 of the body housing 126 and the coupling hole 135b of the fixing plate 135a. The fixing plate 135a is coupled to the body housing 126. The coupling structure between the fixing plate 135a and the body housing 126 is not limited to the aforementioned method, but other methods such as a welding, can be used.

The elastic member 136 is formed as a plate spring to be fixed to the connector 135 at both ends 136b thereof are wound on the protrusion 135c of the connector 135. In order to reduce a frictional resistance between the slide member 137, the elastic member 136 is provided with a curved portion 136a curved towards the slide member 137 so as to linearly-contact the slide member 137.

The elastic member 136 is inserted between the rail 132 and the slide member 137. The elastic member 136 is moved along the rail 132 and the slide member 137 under a state that the curved portion 136a is always in contact with the slide member 137, and is thereby elastically deformed.

Since the slide member 137 and the elastic member 136 are slidably moved under a state of being in contact with each other, a lubrication film for performing a lubrication there between is preferably formed at least one side of the slide member 137 and the elastic member 136. The lubrication film is preferably formed of metal or Teflon. In one embodiment, the rail 132 is installed at the body housing 126 and fixed to the guide member 134.

Hereinafter, operation of the sliding mechanism 130 provided at the slide type mobile terminal according to the first embodiment of the present invention will be explained with reference to FIGS. 10 to 12.

Figure 10:
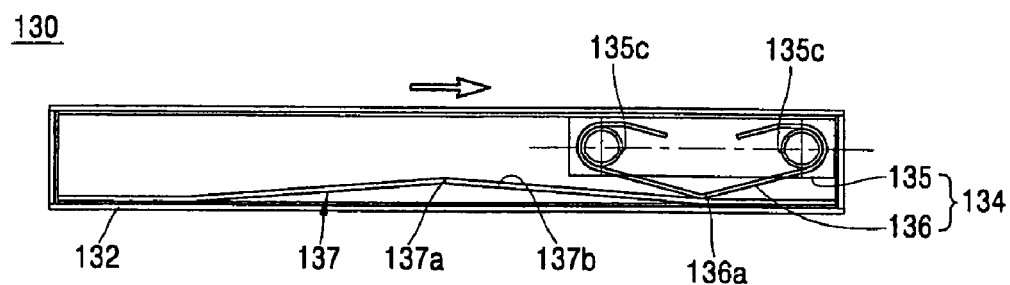
FIGS. 10 to 12 are operation views of the sliding mechanism provided at the slide type mobile terminal according to the first embodiment of the present invention.

As shown in FIG. 10, in case of opening or covering the front surface of the body 120, the user slidably moves the cover 110 from the body 120. The rail 132 moves on the basis of the stationary guide member 134. When the rail 132 is continuously moved, the elastic member 136 of the guide member 134 is gradually contracted according to a width between the rail 132 and the slide member 137.

Figure 11:
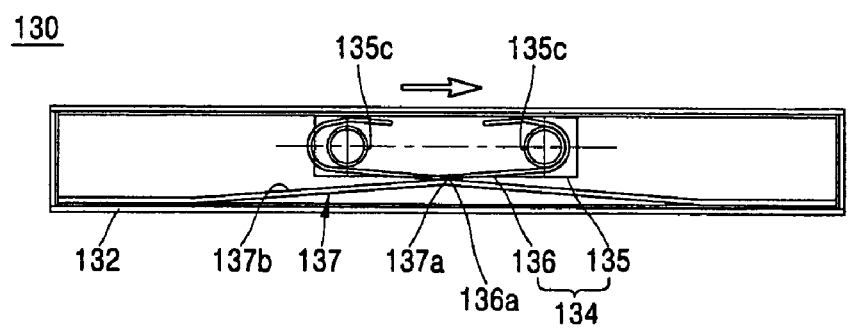

As shown in FIG. 11, when the rail 132 passes through the position of the curved portion 137a of the slide member 137, that is, the position that the width between the rail 132 and the slide member 137 is minimized, the width between the rail 132 and the slide member 137 is gradually increased.

Figure 12:
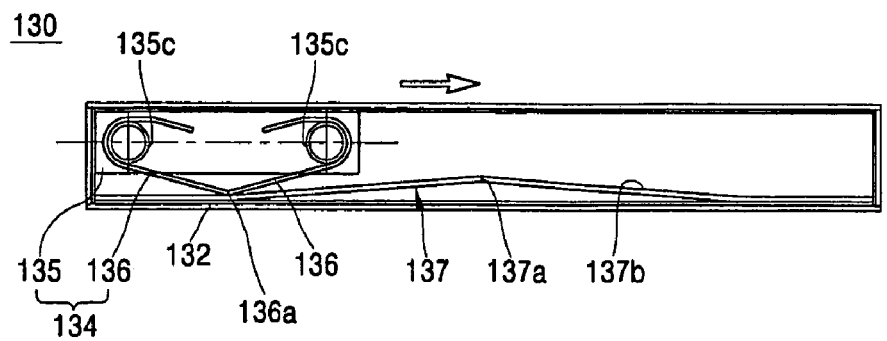

According to this, as shown in FIG. 12, an elastic restoration force is generated at the contracted elastic member 136. Also, by a repelling force against the elastic restoration force of the elastic member 136, a force is applied to the slide member 137 in a slide direction of the rail 132. According to this, the rail 132 slidably moves without need for a user's exerting force.

Therefore, if the user moves the cover 110 only up to the position that the curved portion 137a of the rail 137 meets the curved portion 136a of the elastic member 136, the cover 110 slidably moves from the body 120 to open or cover the front surface of the body 120.

In the slide type mobile terminal according to the first embodiment of the present invention, if the cover 110 is moved up to a certain position from the body 120, the cover 110 moves automatically to open or cover the body 120. According to this, it is easier to slide-move the cover 110 and the body 120. Also, since the distance that the cover 110 is moved by the user is short, the user can easily open or cover the body 120 with his/her one hand.

Second Embodiment

Hereinafter, a slide type mobile terminal according to the second embodiment of the present invention will be explained with reference to FIGS. 13 to 21. The same reference numerals refer to the same or similar parts as described with respect to the first embodiment.

Figure 13:
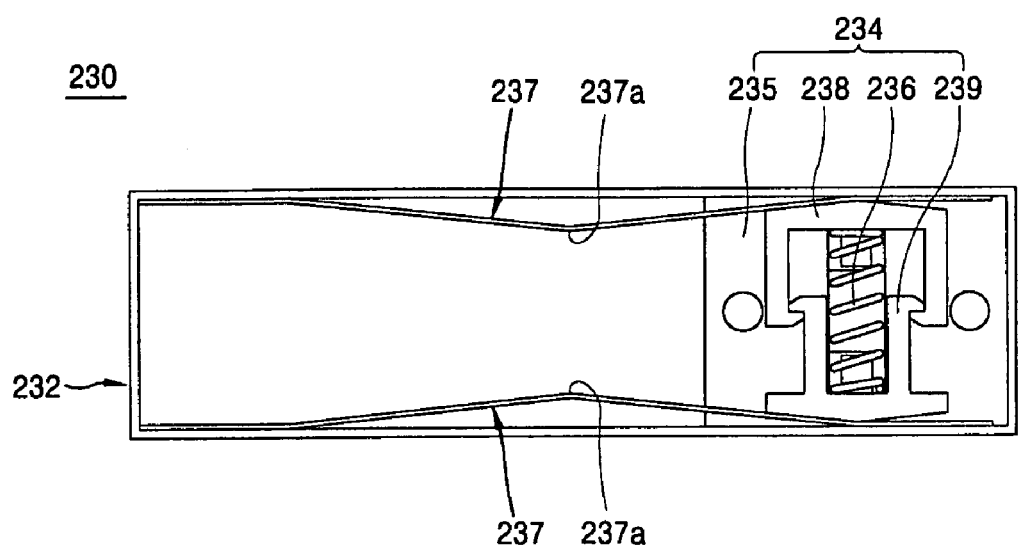
FIG. 13 is a plane view showing a sliding mechanism provided at a slide type mobile terminal according to a second embodiment of the present invention.

In case that the cover 110 is moved to a certain position by being slide-moved from the body 120, a sliding mechanism 230 applies an external force to the cover 110 so that the cover 110 can move automatically. As shown in FIG. 13, the sliding mechanism 230 comprises a rail 232 recessed at one side of the cover 110 and extended in a slide direction of the cover 110; a guide member 234 fixed to the body 120, slidably inserted into the inner center of the rail 232 in a width direction, and having an elastic force, for guiding a slide motion of the cover 110; and a pair of slide members 237 installed between the rail 232 and the guide member 234, for varying an elastic force of the guide member 234 along a motion of the rail 232.

Figure 14:
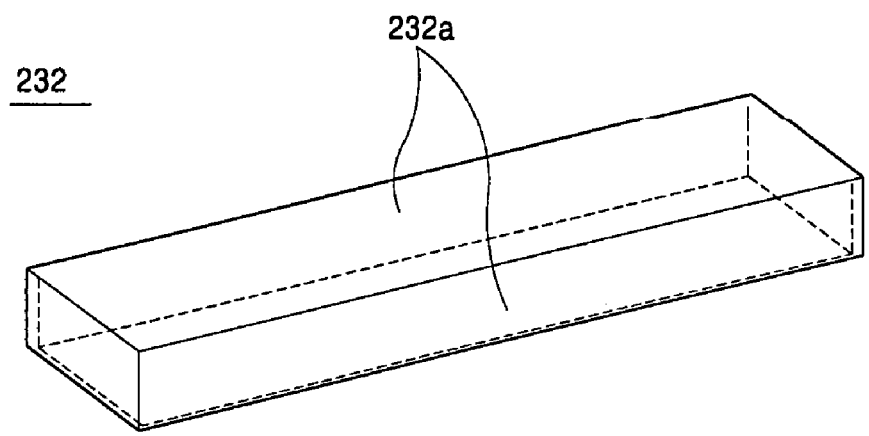
FIG. 14 is a perspective view showing a rail of the sliding mechanism provided at the slide type mobile terminal according to the second embodiment of the present invention.
Figure 15:
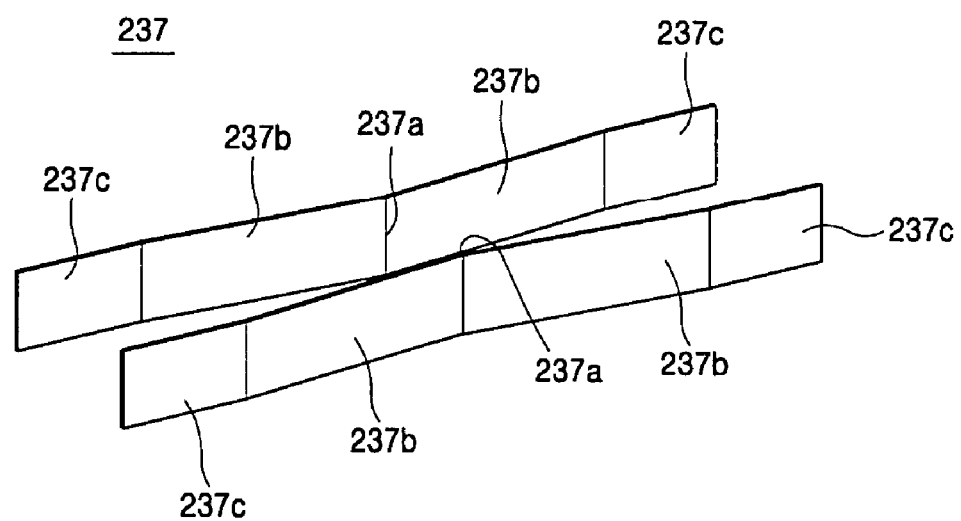
FIG. 15 is a perspective view showing a slide member of the sliding mechanism provided at the slide type mobile terminal according to the second embodiment of the present invention.

As shown in FIG. 14, the rail 232 is formed in a rectangular parallelepiped shape with one side opened as a plurality of plates 232a are coupled to one another. As shown in FIG. 15, the slide member 237 is installed at both inner sides of the rail 232, and is formed as a plate shape having a curved portion 237a convexly curved towards the inner side direction of the rail 232 so as to vary the width of the rail 232 along the slide direction of the cover 110. The slide member 237 is provided with a fixed portion 237c having a surface parallel to the inner surface of the rail 232 and fixed to the inner surface of the rail 232, and an inclination surface 237b having a gradient of a certain angle towards the inner side of the rail 232 at both sides.

Figure 16:
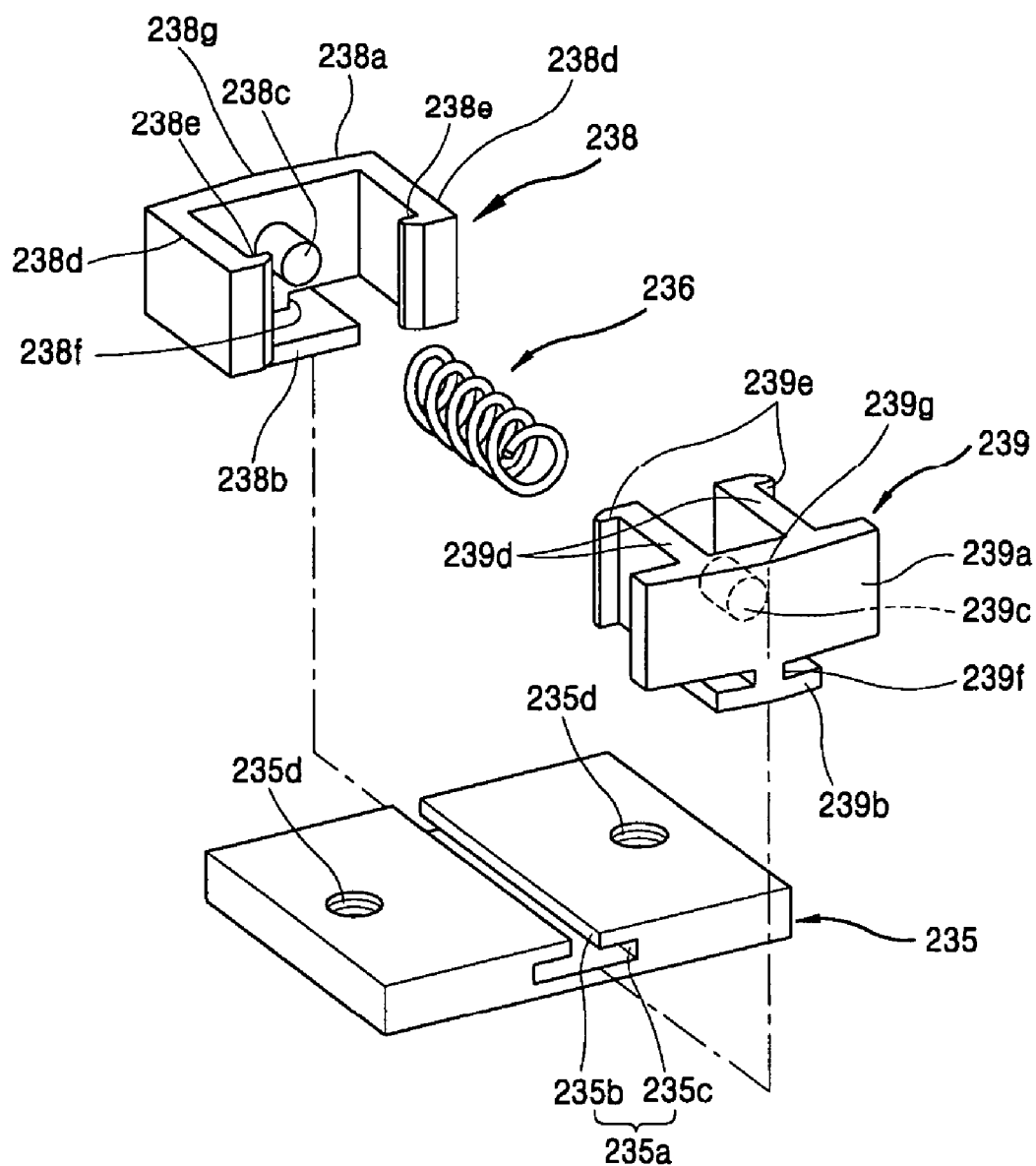
FIG. 16 is a disassembled perspective view showing a guide member of the sliding mechanism provided at the slide type mobile terminal according to the second embodiment of the present invention.

As shown in FIG. 16, the guide member 234 comprises a connector 235 fixed to the body 120; first and second members 238 and 239 slidably supported by the connector 235, respectively; and a biasing member 236 installed between the first member 238 and the second member 239, for providing an elastic force to a slide motion of the first and second members 238 and 239.

The connector 235 is provided with a slot 235a for slidably fixing the first and second members 238 and 239; and a coupling hole 235d fixed to the body 120. The slot 235a comprises a stud inserting portion 235b recessed at the inner side of the connector 235 and extended in a slide direction of the first and second members 238 and 239, for inserting studs 238f and 239f of the first and second members 238 and 239 which will be later explained; and an insertion groove 235c formed at the inner side of the connector 235 with a width wider than that of the stud inserting portion 235b, for slidably inserting insertion portions 238b and 239b of the first and second members 238 and 239 which will be later explained.

The first member 238 comprises a spring supporting portion 238a having a spring seat 238c protruded to support one end of the biasing member 236 at one side thereof, and inserted into the rail 232 to be in contact with the slide member 237; a stud 238f extended from the spring supporting portion 238a towards the connector 235; an insertion portion 238b formed at one end of the stud 238f with a width wider than that of the stud 238f, and slidably inserted into the slot 235a of the connector 235; and a connection rod portion 238d extended from the spring supporting portion 238a towards the second member 239 at both sides of the spring seat 238c, and having a L-shaped jaw 238e at one end thereof.

The second member 239 comprises a spring supporting portion 239a having a spring seat 239c protruded to support another end of the biasing member 236 at one side thereof, and inserted into the rail 232 to be in contact with the slide member 237; a stud 239f extended from the spring supporting portion 239a towards the connector 235; an insertion portion 239b formed at one end of the stud 239f with a width wider than that of the stud 239f, and slidably inserted into the slot 235a of the connector 235; and a connection rod portion 239d extended from the spring supporting portion 239a towards the first member 238 at both sides of the spring seat 239c, and having a L-shaped jaw 239e engaged with the L-shaped jaw 238e of the first member 238 at one end thereof.

Figure 17:
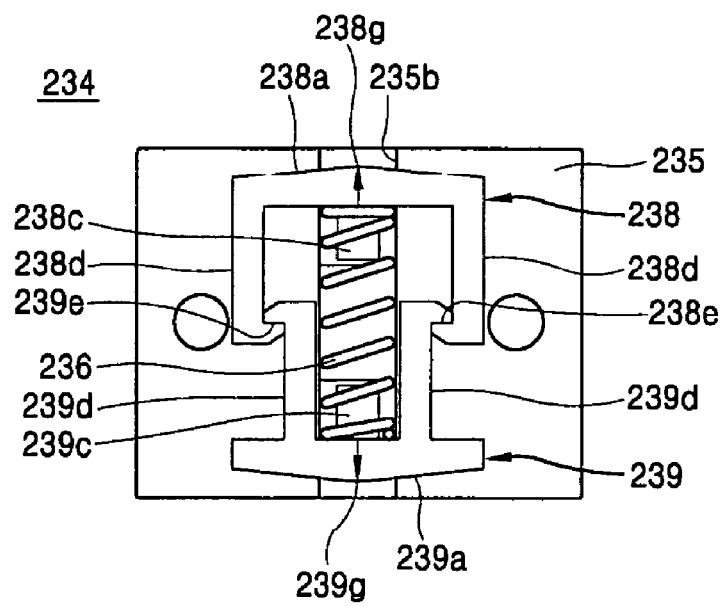
FIGS. 17 and 18 are operational state views of a guide member of the sliding mechanism provided at the slide type mobile terminal according to the second embodiment of the present invention.
Figure 18:
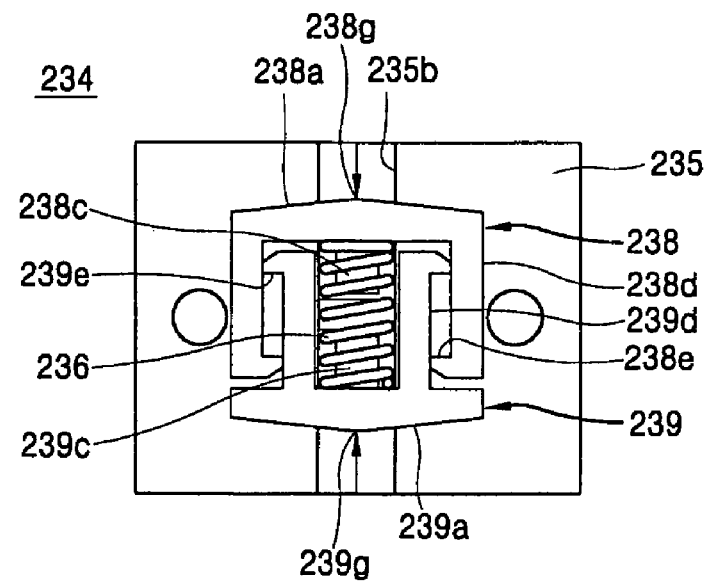

At least one surface of the spring supporting portions 238a and 239a of the first and second members 238 and 239 contacting the slide member 237 is preferably provided with an edge 238g and 239g, respectively, so as to tangentially contact the slide member 237. As shown in FIGS. 17 and 18, the first and second members 238 and 239 of the guide member 234 are movable in opposite directions from each other by way of an elastic force of the biasing member 236 or an external force. The L-shaped jaw s 238e and 239e of the first and second members 238 and 239 can engage each other, thereby preventing the first and second members 238 and 239 from being separated from each other.

Hereinafter, the sliding mechanism 230 provided at the slide type mobile terminal according to the second embodiment of the present invention will be explained with reference to FIGS. 19 to 21.

Figure 19:
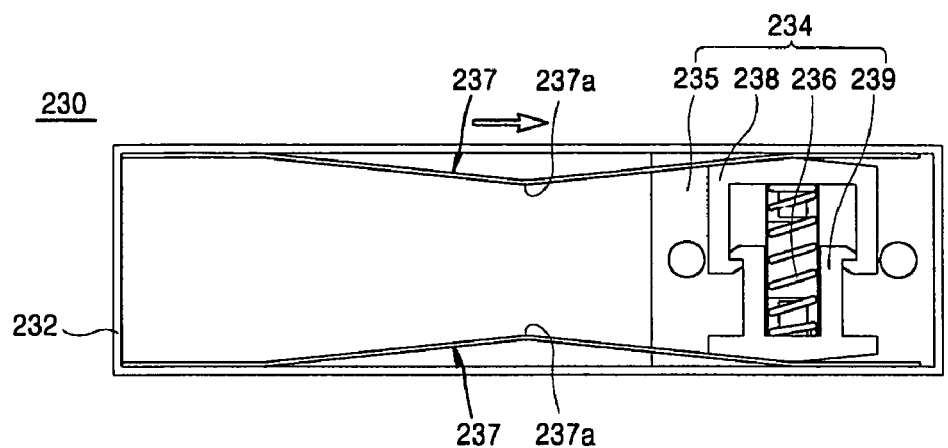
FIGS. 19 to 21 are operational state views of the sliding mechanism provided at the slide type mobile terminal according to the second embodiment of the present invention.

As shown in FIG. 19, when the user slidably moves the cover 110 from the body 120 the rail 232 moves on the basis of the stationary guide member 234. When the rail 232 is continuously moved, the first and second members 238 and 239 of the guide member 234 are moved in an adjacent direction to each other accordingly as the width between the slide members 237 is decreased. At this time, the biasing member 236 is gradually contracted.

Figure 20:
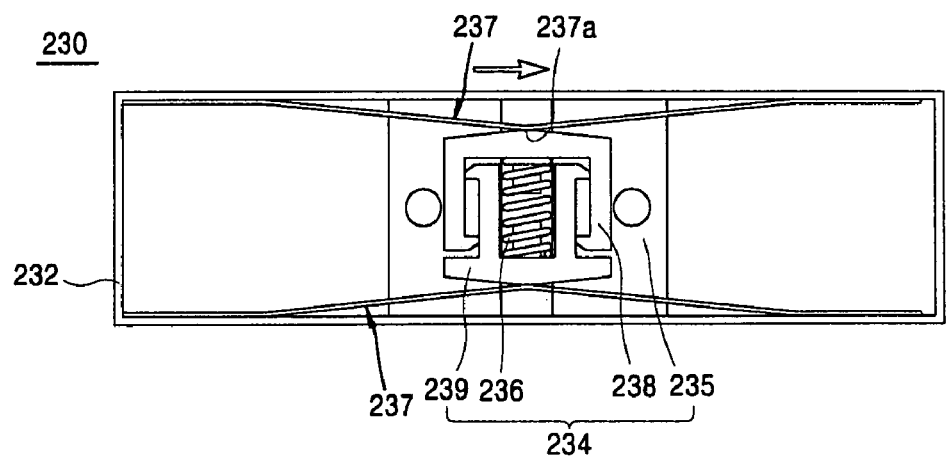

As shown in FIG. 20, when the first and second members 238 and 239 pass through the position of the curved portion 237a of the slide member 237, that is, the position that the width between the slide members 237 is minimized, the width between the slide members 237 is gradually increased.

Figure 21:
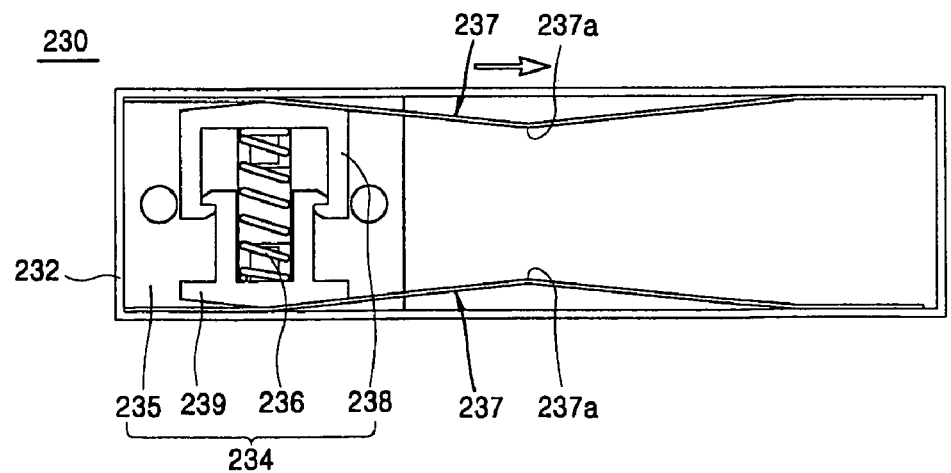

Referring to FIG. 21, by an elastic restoration force of the contracted biasing member 236, a force is applied to the first and second members 238 and 239 in an opposite direction from each other. Since a force is applied to the rail 232 in a slide direction of the rail 232, the rail 232 slidably-moves without a user exerting force. Therefore, if the user moves the cover 110 only up to the position that the curved portion 237a of the rail 237 meets the first and second members 238 and 239, the cover 110 slidably moves for itself thereafter from the body 120 thereby to open or cover the front surface of the body 120.

Third Embodiment

Hereinafter, a slide type mobile terminal according to the third embodiment of the present invention will be explained with reference to FIGS. 22 to 33.

Figure 22:
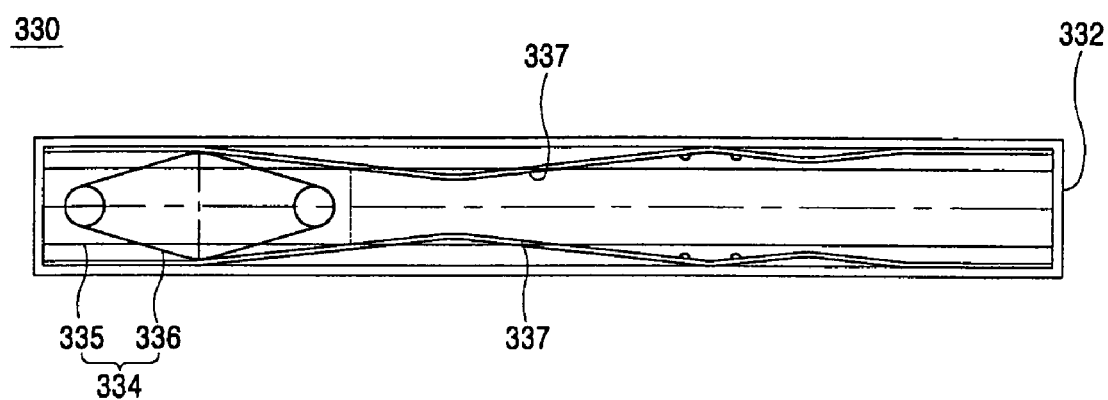

In case that the cover 110 is moved to a certain position by being slide-moved from the body 120, a sliding mechanism 330 applies an external force to the cover 110 so that the cover 110 can move automatically. As shown in FIG. 22, the sliding mechanism 330 comprises a rail 332 recessed at one side of the cover 110 and extended in a sliding direction of the cover 110; a guide member 334 fixed to the body 120, slidably inserted into the inner center of the rail 332 in a width direction, and having an elastic force, for guiding a slide motion of the cover 110; and a pair of slide members 337 installed between the rail 332 and the guide member 334, for varying an elastic force of the guide member 334 along a motion of the rail 332.

Figure 23:
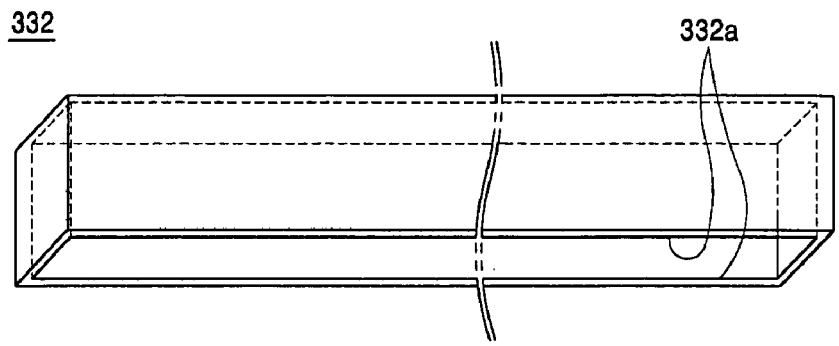
FIG. 23 is a perspective view showing a rail of the sliding mechanism provided at the slide type mobile terminal according to the third embodiment of the present invention.
Figure 24:
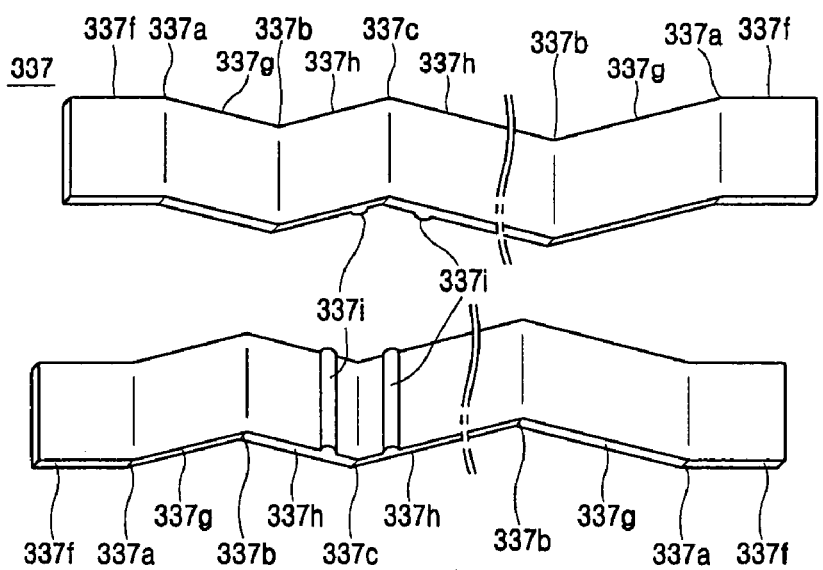
FIG. 24 is a perspective view showing a slide member of the sliding mechanism provided at the slide type mobile terminal according to the third embodiment of the present invention.

As shown in FIG. 23, the rail 332 has a rectangular parallelepiped shape, for example, that one side thereof is opened accordingly as a plurality of plates 332a are coupled to one another. As shown in FIG. 24, the slide member 337 is installed at both inner sides of the rail 332, and is formed as a plate shape having a plurality of curved portions so as to vary the width of the rail 332 along the slide direction of the cover 110. In one embodiment, the slide member 337 comprises a first curved portion 337c convexly curved towards the outside of the rail 332 at the periphery of the center thereof and having a pair of first inclination surfaces 337h.

Also included are a pair of second curved portions 337b convexly curved towards the inner side of the rail 332 at both sides of the first curved portion 337c and having a pair of second inclination surfaces 337g, and a pair of third curved portions 337a curved at both sides of the second curved portions 337b and having a pair of fixed surfaces 337f fixed to the inner surface of the rail 332.

Each curved angle of the first curved portion 337c and the pair of second curved portions 337b relates to a position of each curved portion. The curved angle of the plurality of curved portions can be equal or be different from each other. The number of the curved portions of the slide member 337 is not limited to the aforementioned structure.

Figure 25:
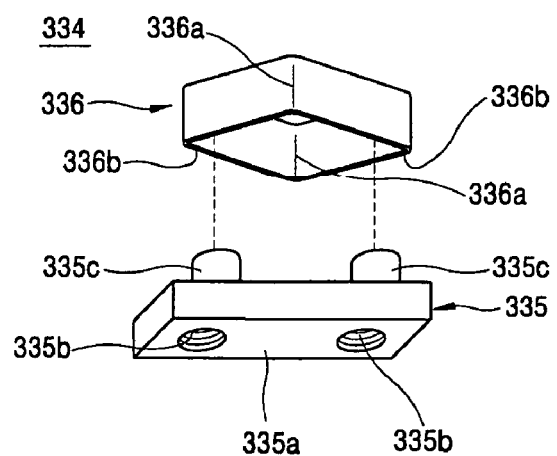
FIG. 25 is a disassembled perspective view showing a guide member of the sliding mechanism provided at the slide type mobile terminal according to the third embodiment of the present invention.

As shown in FIG. 25, the guide member 334 comprises a connector 335 fixed to the body 120; an elastic member 336 supported at the connector 335, positioned between the slide members 337, and elastically deformed by a width variance between the slide members 337 when the rail 332 is moved. The connector 335 comprises a fixing plate 335a having a coupling hole 335b fixed to the body 120; and a protrusion 335c protruded from the fixing plate 335a and supporting the elastic member 336.

The elastic member 336 is formed in a quadrangular shape with two corners 336b thereof are fixed to the protrusions 335c of the connector 335 by being wound thereon, and other two corners 336a are in tangential contact with the slide member 337, respectively. The elastic member 336 is elastically deformed by a motion of the rail 332 under a state of being in contact with the slide member 337.

Figure 26:
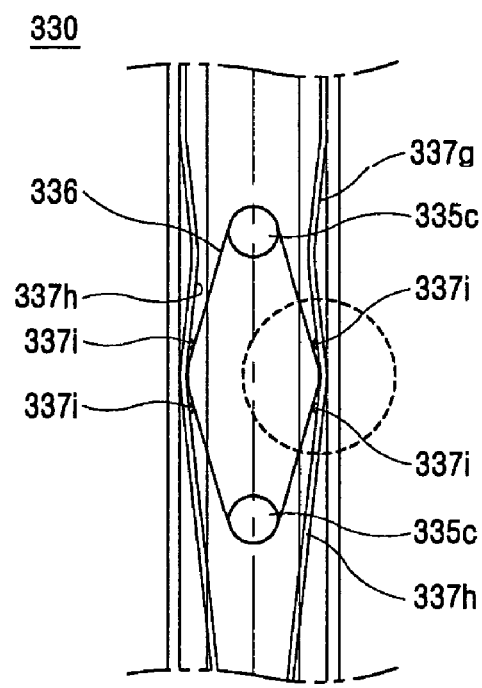
FIG. 26 is an enlarged plane view of the sliding mechanism provided at the slide type mobile terminal, according to the third embodiment of the present invention.
Figure 27:
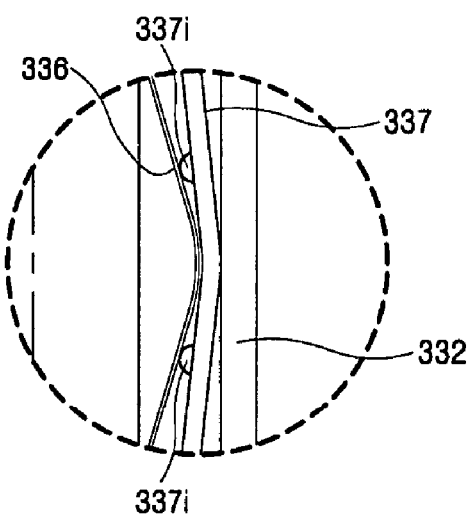
FIG. 27 is an enlarged view of a main part of FIG. 26.
Figure 28:
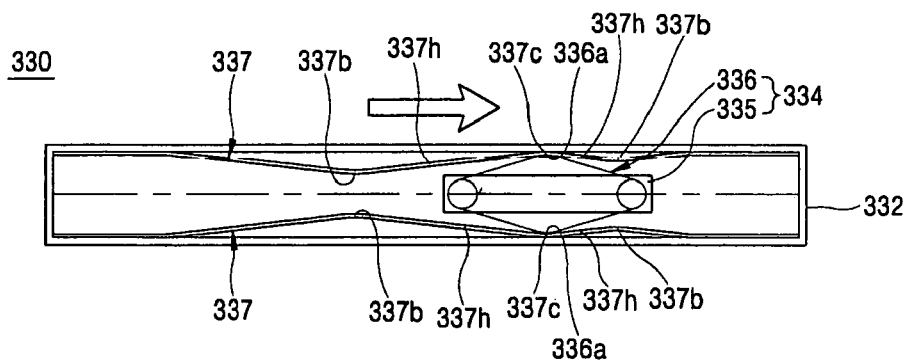
FIGS. 28 to 33 are operational views of the sliding mechanism provided at the slide type mobile terminal, according to the third embodiment of the present invention.
Figure 29:
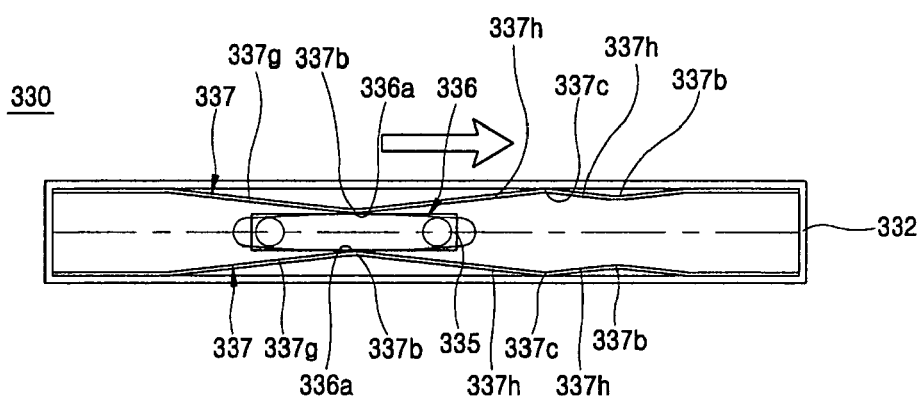
Figure 30:
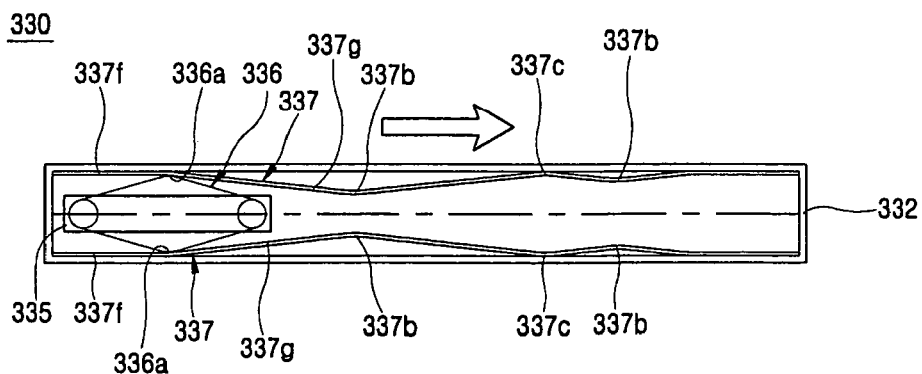
Figure 31:
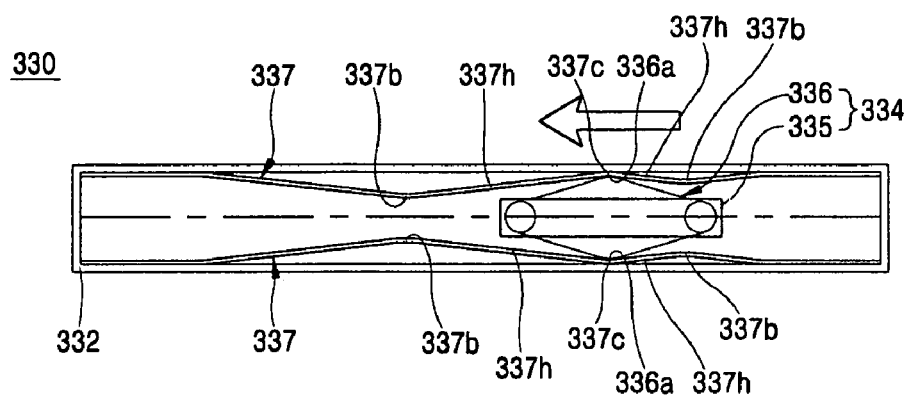
Figure 32:
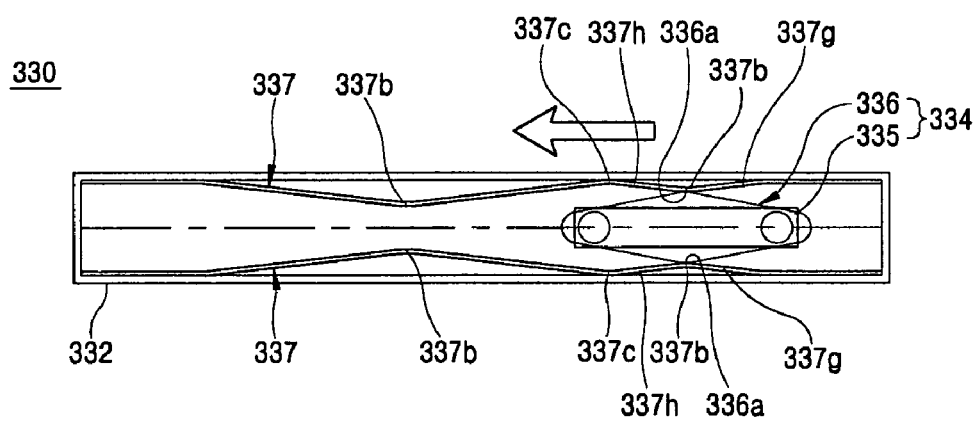
Figure 33:
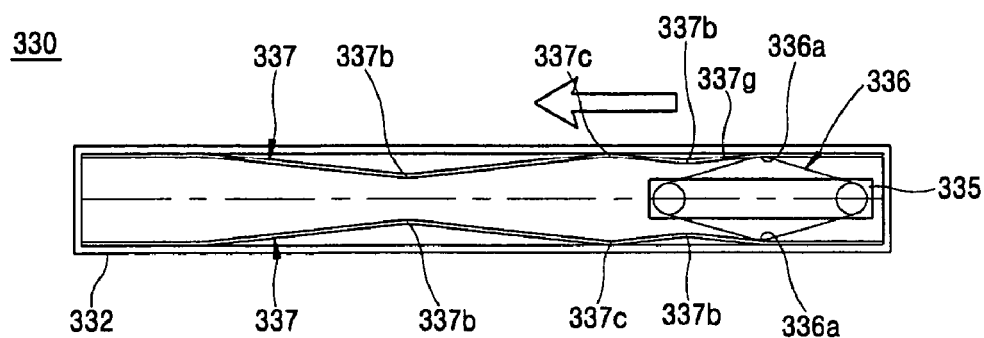

As shown in FIGS. 26 and 27, in case that the cover 110 completely covers the body 120, the guide member 334 is positioned at the first curved portion 337c, that is, between the first inclination surfaces 337h. The protrusion 337i formed at the first inclination surface 337h prevents the elastic member 336 from being easily moved.

Hereinafter, operation of the sliding mechanism 330 provided at the slide type mobile terminal according to the third embodiment of the present invention will be explained with reference to FIGS. 28 to 33.

As shown in FIGS. 28 to 31, in case that the cover 110 completely covers the body 120, the guide member 334 is positioned at the first curved portion 337c of the slide member 337. Also, in case that the cover 110 is slide-moved in order to open or cover the front surface of the body 120, the rail 332 is moved in the arrow direction.

As shown in FIGS. 28 to 31, in case that the cover 110 completely covers the body 120, the guide member 334 is positioned at the first curved portion 337c of the slide member 337. Also, in case that the cover 110 is slide-moved in order to open or cover the front surface of the body 120, the rail 332 is moved in the arrow direction.

As shown in FIGS. 30 to 33, when the rail 332 passes through the position that the width between the slide members 337 is minimized, that is, the second curved portion 337b of the slide member 337, the width between the slide members 337 is gradually increased. According to this, an elastic restoration force is generated at the contracted elastic member 336. By a repulsive force against the elastic restoration force of the elastic member 336, a force is applied to the slide member 337 in the slide direction of the rail 332. Therefore, if the user moves the cover 110 only up to a certain position, the cover 110 slidably moves from the body 120 to open or cover the front surface of the body 120, with minimal exertion of force.

Fourth Embodiment

Hereinafter, a slide type mobile terminal according to the fourth embodiment of the present invention will be explained with reference to FIGS. 34 to 40.

Figure 34:
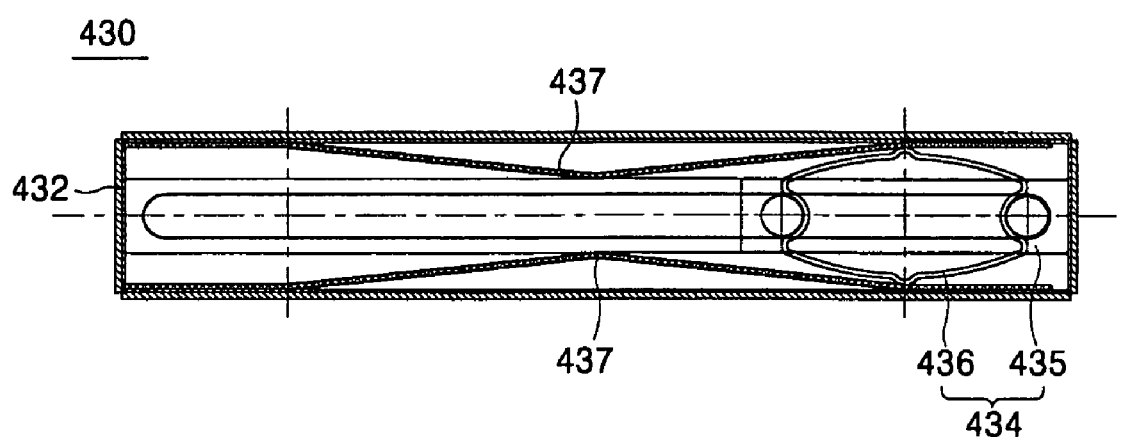
FIG. 34 is a plane view showing a sliding mechanism provided at a slide type mobile terminal according to a fourth embodiment of the present invention.

In case that the cover 110 is moved to a certain position by being slide-moved from the body 120, a sliding mechanism 430 applies an external force to the cover 110 so that the cover 110 can move automatically. As shown in FIG. 34, the sliding mechanism 430 comprises a rail 432 recessed at one side of the cover 110 and extended in a slide direction of the cover 110; a guide member 434 fixed to the body 120 and slidably inserted into the inner center of the rail 432 in a width direction, for guiding a slide motion of the cover 110; and a pair of slide members 437 installed inside the rail 432 and elastically deformed by a motion of the rail 432, for varying a width of the rail 432.

Figure 35:
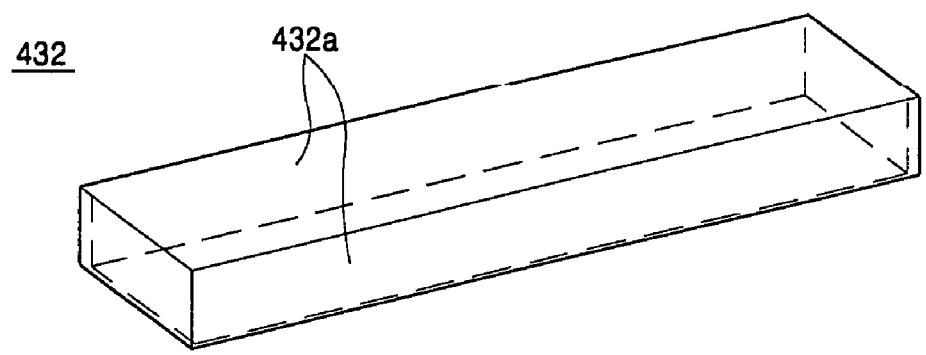
FIG. 35 is a perspective view showing a rail of the sliding mechanism provided at the slide type mobile terminal according to the fourth embodiment of the present invention.

As shown in FIG. 35, the rail 432 has a rectangular parallelepiped shape that one side thereof is opened accordingly as a plurality of plates 432a are coupled one another.

Figure 36:
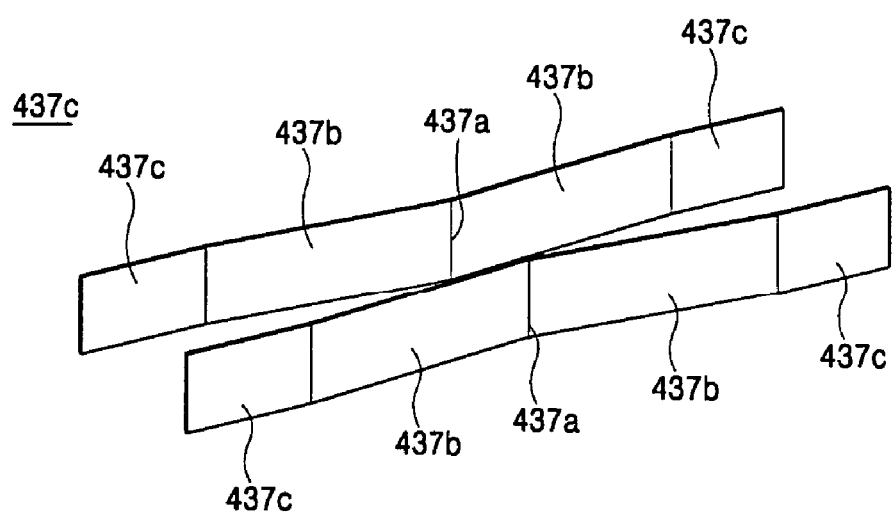
FIG. 36 is a perspective view showing a slide member of the sliding mechanism provided at the slide type mobile terminal according to the fourth embodiment of the present invention.

As shown in FIG. 36, the slide member 437 has a plate shape having a curved portion 437a installed at both inner sides of the rail 432 and convexly curved toward the inner direction of the rail 432 so that the width of the rail 432 can be varied along the slide direction of the cover 110. The slide member 437 is provided with fixed portions 437c fixed to the inner surface of the rail 432, and inclination surfaces 437b having a gradient towards the inner side of the rail 432 at both sides thereof. In case of applying an external force to the slide member 437, the slide member 437 is deformed so that the inclination surfaces 437b and the fixed portions 437c can form the same plane surface. Also, in case that the external force is released, the slide member 437 maintains the original state by its own elastic restoration force.

Figure 37:
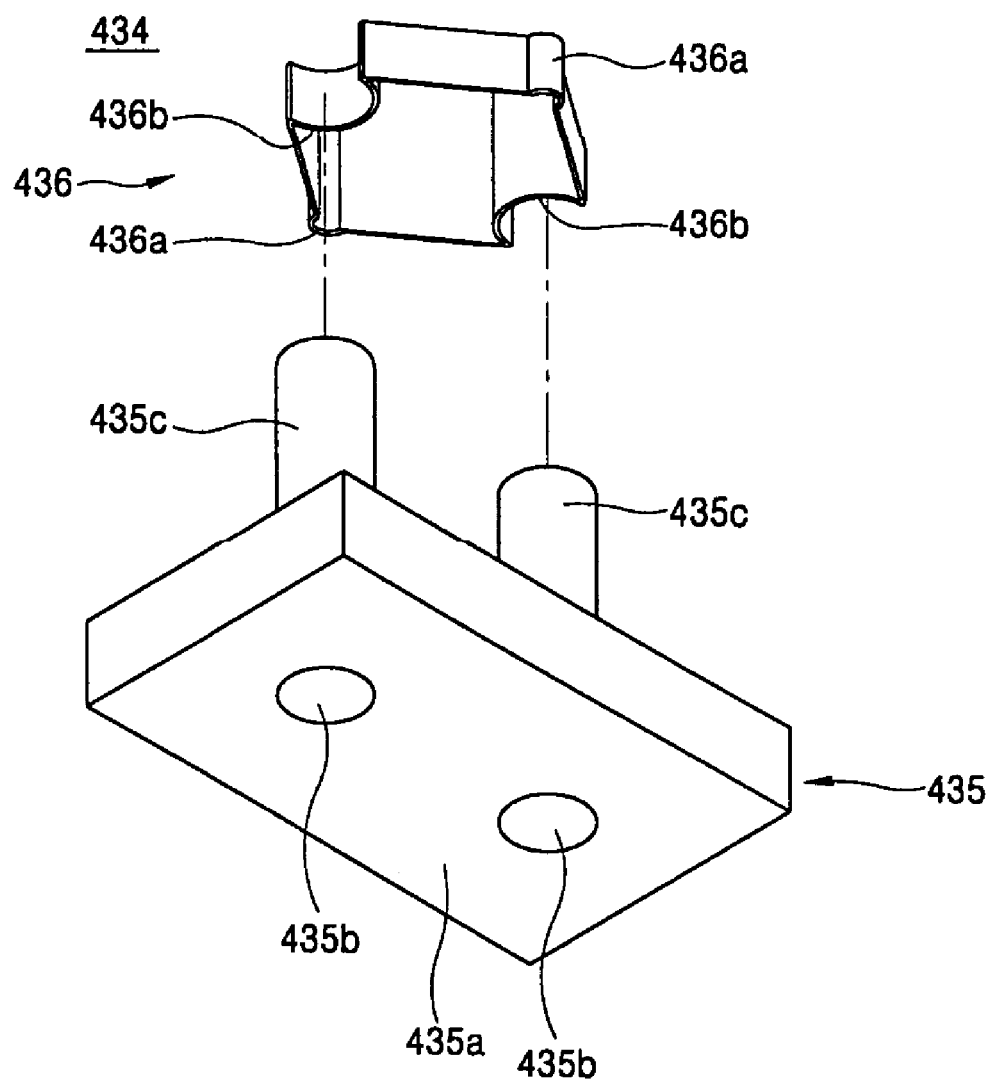
FIG. 37 is a disassembled perspective view showing a guide member of the sliding mechanism provided at the slide type mobile terminal according to the fourth embodiment of the present invention.

As shown in FIG. 37, the guide member 434 comprises a connector 435 fixed to the body 120, and a pressurizing member 436 supported at the connector 435 and positioned between the slide members 437, for elastically deforming the slide member 437 when the rail 432 is moved. The connector 435 comprises a fixing plate 435a having a coupling hole 435b fixed to the body 120; and a protrusion 435c protruded from the fixing plate 435a and supporting the pressurizing member 436.

The pressurizing member 436 is formed as a plate shape thus to be fixed to the connector 435 at as both ends 436b and wound on the protrusion 435c of the connector 435. The pressurizing member 436 is provided with a pair of protrusion portions 436a protruded towards the inner side of the rail 432 and tangentially contacting the slide member 437. Therefore, the pressuring member 436 is slide-moved by a motion of the rail 432 when the protrusion portions 436a are in contact with the slide member 437, and elastically deforms the slide member 437.

Hereinafter, operation of the sliding mechanism 430 provided at the slide type mobile terminal according to the fourth embodiment of the present invention will be explained with reference to FIGS. 38 to 40.

Figure 38:
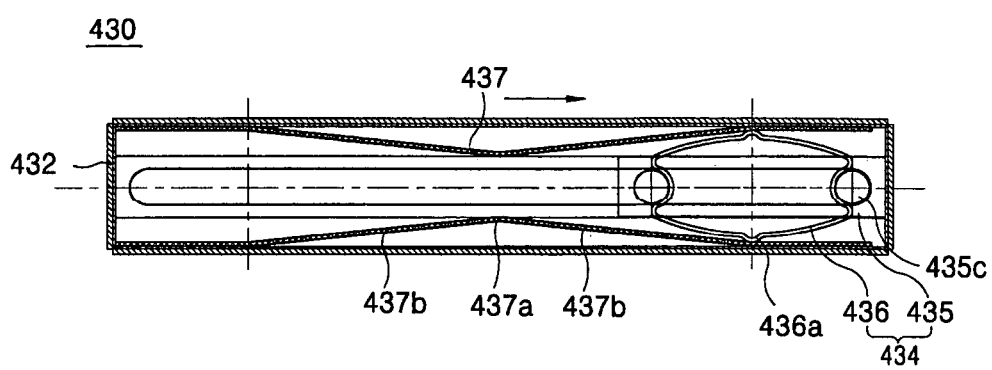
FIGS. 38 to 40 are operational views of the sliding mechanism provided at the slide type mobile terminal according to the fourth embodiment of the present invention.

As shown in FIG. 38, in case of opening or covering the front surface of the body 120, the user slidably moves the cover 110 from the body 120. At this time, the rail 432 moves on the basis of the stationary guide member 434. When the rail 432 is continuously moved, the guide member 434 pushes the inclination surfaces 437b of the slide member 437 and thereby the slide member 437 is elastically deformed to be parallel to the inner surface of the rail 432.

Figure 39:
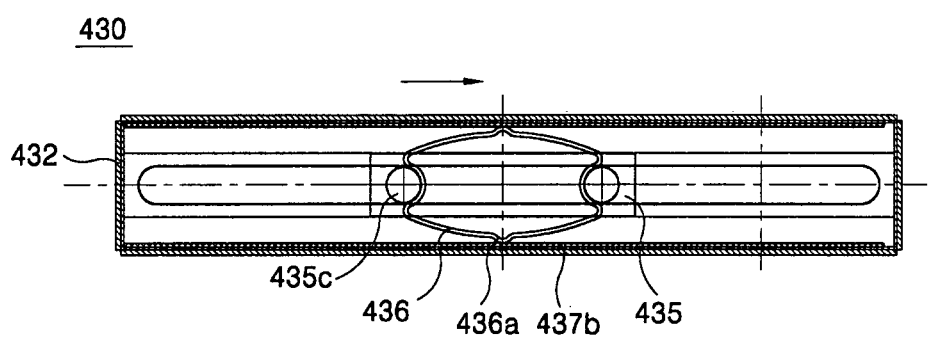
Figure 40:
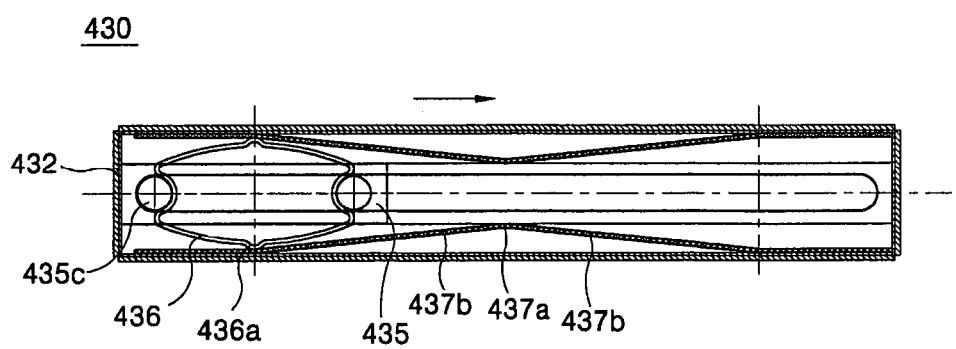

As shown in FIGS. 39 and 40, when the guide member 434 passes the position of the curved portion 437a of the slide member 437, an elastic restoration force is applied to the elastically deformed slide member 437. By a repulsive force against the elastic restoration force of the slide member 437, a force is applied to the cover 110 in the slide direction. According to this, the rail 432 slidably moves for itself without a user's external force.

Therefore, if the user moves the cover 110 up to a position that the guide member 434 meets the curved portion 437a of the slide member 437, the cover 110 slidably moves thereafter from the body 120 thereby to open or cover the front surface of the body 120 without additional exertion of external force.

In the slide type mobile terminal according to the present invention, when the cover is moved up to a certain position from the body, the cover moves automatically thereafter thereby to open or cover the body. Accordingly, it is convenient to slide-move the cover over the body. Also, since the distance that the cover is moved by the user is short, the user can easily open or cover the body with his/her one hand. The technique individually explained in each embodiment of the present invention can be combined to each other.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A sliding mechanism for slidably connecting first and second bodies of a mobile communication terminal, the sliding mechanism comprising:
   an elongated groove formed on a first surface of the first body, the elongated groove having a depth, a length and a width;
   a first elongated V-shaped plate configured to fit in the elongated groove, the first elongated V-shaped plate having first and second ends corresponding to the first and second ends of the elongated groove, and a first tapered point corresponding to a first section of the elongated groove positioned in between the first end and the second end of the elongated groove to form a first sliding passage way that narrows at the first tapered point; and
   a guide member projecting from the second body and configured to slidably engage the first elongated V-shaped plate while sliding in the first sliding passage way such that as the guide member slides towards the first tapered point additional resistance is applied to the guide member, and as the guide member slides away from the first tapered point less resistance is applied to the guide member.

2. The sliding mechanism of claim 1, wherein the first elongated V-shaped plate is flexible such that it deforms as to widen the first sliding passage way as the guide member slides through the first tapered point in the first sliding passage way.

3. The sliding mechanism of claim 1, further comprising:
   a second elongated V-shaped plate configured to fit in the elongated groove, facing the first V-shaped elongated plate, the second elongated V-shaped plate having a second tapered point corresponding to the first tapered point of the first elongated V-shaped plate, such that a second sliding passage way is formed between the first and second V-shaped elongated plates, wherein the second sliding passage way narrows at the first and second tapered points, such that the guide member can slidably engage the first and second V-shaped plates while sliding in the second sliding passage way.

4. The method of claim 3, wherein when the guide member slides towards the first and second tapered points additional resistance is applied to the guide member.

5. The method of claim 3, wherein when the guide member slides away from the first and second tapered points less resistance is applied to the guide member.

6. The sliding mechanism of claim 1, wherein at least one of the first and second elongated V-shaped plates is flexible such that it deforms as to provide a wider passage way as the guide member slides through the first and second tapered points in the second sliding passage way.

7. A system for slidably connecting a cover to a front surface of a mobile communication terminal, the system comprising:
   a rail member formed as an elongated cavity in an inner face of the cover;
   a guide member comprising a first part fixed to the front surface of the mobile communication terminal and a second part removably connected to the first part, wherein the second part comprises a first tapered point; and
   a slide member in shape of an elongated plate, having a width and a length, configured to fit inside the rail member in the elongated cavity such that the width of the elongated plate corresponds to depth of the elongated cavity, and first and second ends of the elongated plate respectively correspond to the first and second ends of the elongated cavity, wherein the elongated plate is bent in a first portion to form a summit in between the first and second ends of the elongated plate, such that when the slide member is positioned inside the rail member the length of the elongated plate traverses length of the elongated cavity to divide the elongated cavity into a first side and a second side longitudinally, wherein the first side comprises top portion of the summit and the second side comprises bottom portion of the summit, wherein when the guide member is inserted into the rail, the second part engages the slide member on the first side, such that the first tapered point slidably contacts the summit as the guide member slides along the length of the rail.

8. The system of claim 7, wherein when the first tapered point contacts the summit a maximum resistance is applied against sliding movement of the cover along the front surface of the mobile communication terminal.

\* \* \* \* \*